(12) United States Patent
Takahashi et al.

(10) Patent No.: US 7,903,717 B2
(45) Date of Patent: Mar. 8, 2011

(54) RECEIVER, RECEIVING METHOD, PROGRAM AND INFORMATION RECORDING MEDIUM

(75) Inventors: Satoshi Takahashi, Tokyo (JP); Hiroshi Harada, Tokyo (JP); Chang-Jun Ahn, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 770 days.

(21) Appl. No.: 11/817,625

(22) PCT Filed: Mar. 2, 2005

(86) PCT No.: PCT/JP2005/003534
§ 371 (c)(1),
(2), (4) Date: Aug. 31, 2007

(87) PCT Pub. No.: WO2006/092859
PCT Pub. Date: Sep. 8, 2006

(65) Prior Publication Data
US 2009/0010307 A1    Jan. 8, 2009

(51) Int. Cl.
*H04B 1/00* (2006.01)
(52) U.S. Cl. ......... 375/130; 375/136; 375/144; 375/147; 375/148; 375/260; 375/264; 375/286; 375/287; 375/289; 375/291; 375/324; 375/340
(58) Field of Classification Search .................. 375/130, 375/136, 144, 147–148, 260, 264, 286–291, 375/320, 324, 349, 377
See application file for complete search history.

(56) References Cited

U.S. PATENT DOCUMENTS
7,310,503 B2 * 12/2007 Ido .............................. 455/140

FOREIGN PATENT DOCUMENTS
JP    64-029121    1/1989
(Continued)

OTHER PUBLICATIONS

Takako Yamamura et al., "Kosoku Tekio Hencho Hoshiki o Mochiita OFDM Ido Musen Denso System ni Kansuru Ichi Kento", 2000 Nen The Institute of Electronics, Information and Communication Engineers Sogo Taikai Koen Ronbunshu, Tsushin 1 B-5-20, Mar. 7, 2000, p. 405.

(Continued)

*Primary Examiner* — Mohammad H Ghayour
*Assistant Examiner* — Sophia Vlahos
(74) *Attorney, Agent, or Firm* — Honigman Miller Schwartz and Cohn LLP

(57) ABSTRACT

When a receiver (200) receives a signal transmitted from a transmitter, an A/D converter (204) converts the signal into a digital signal having two or more levels by A/D conversion. A zero-level detector (207) converts the signal into a two-level digital signal of positive and negative levels. The converted signals are subjected to spectrum despreading by correlators (206, 208), respectively. Whichever signal has a higher intensity is selected by absolute value detectors (209, 210), a comparator (211), and a switch (212). A decoder (213) decodes the selected signal. In a receiving state where the zero-level detector (207) is selected, the transmitter transmits the transmission signal after the signal is converted into a two-level signal. In a receiving state where the A/D converter (204) is selected, the transmitter transmits the transmission signal after the signal is converted into a signal having two or more levels.

10 Claims, 6 Drawing Sheets

FOREIGN PATENT DOCUMENTS

| | | |
|---|---|---|
| JP | 05-308344 | 11/1993 |
| JP | 06-164547 | 6/1994 |
| JP | 9-510841 | 10/1997 |
| JP | 2001-251188 A | 9/2001 |
| JP | 2003-218834 | 7/2003 |
| JP | 2003-332973 A | 11/2003 |

OTHER PUBLICATIONS

Akihito Kato et al., "Digital Matched Filter o Mochiita Kosoku Chien Profiler", 2000 Nen Proceedings of the IEICE Society Conference 1 B-1-24, Sep. 7, 2000, p. 24.

Addison-Wesley Wireless Communications Series, CDMA, "Principles of Spread Spectrum Communication", Andrew J. Viterbi, Jan. 1995.

* cited by examiner

US 7,903,717 B2

RECEIVER, RECEIVING METHOD, PROGRAM AND INFORMATION RECORDING MEDIUM

TECHNICAL FIELD

The present invention relates to a receiver and a receiving method which are suitable for improving the reception sensitivity in spectrum spread communications or the like, a program which realizes them using a computer, and a computer readable information recording medium having the program recorded therein.

BACKGROUND ART

Recently, cellular type digital mobile communication systems demand that a lot of users be accommodated effectively using limited frequency resources. Particularly, attention is paid to spectrum spreading in which a lot of users share radio waves of a wide frequency band. Such a spectrum spread communication technique is disclosed in the following documents.
Non-patent Document 1: Andrew I. Viterbi, CDMA—Principle of Spread Spectrum Communications, Addison-Wesley Publishing Company, p. 29-31, 1995
Patent Document 1: Japanese Patent Application KOKAI Publication No. 2003-218334
Patent Document 2: Japanese Patent Application KOKAI Publication No. H06-164547
Patent Document 3: Japanese Patent Application KOKAI Publication No. H05-308344

Non-patent Document 1 proposes CDMA communication as a basic spectrum spread communication technique.

Patent Document 1 discloses a technique of reducing the high interference power mixed in the band of the desired signal to improve the desired signal-to-interference ratio after despreading, thereby reducing suppression of the reception sensitivity. The method of reducing suppression of the reception sensitivity in the document executes a correction process with a preset value for a frequency noise in an A/D (analog-to-digital) converted value before despreading at the time of demodulating a received signal subjected to spectrum spread in a mobile communication terminal device by despreading the signal after A/D conversion.

Patent Document 2 discloses a technique relating to a modulator and receiver for spectrum spread communication which converts a bit sequence of transmission data to a chip code sequence having a higher transfer rate than that of the bit sequence. The technique of the document uses frequency shift keying in secondary modulation at the time of performing spectrum spread with use of double stage modulation, and demodulates the primary modulation input signal with correlation detection on a frequency detection output on the receiver side.

Patent Document 3 discloses a technique relating to a spectrum spread communication device effective when a non-desired signal appears in a narrow band in the band. The communication device of the document performs A/D conversion of a received signal, performs Fourier transform on the acquired digital signal, performs a predetermined operation thereon to detect a non-desired signal in a narrow band, and determines whether the non-desired signal exceeds an allowable limit value of communication quality based on the detected value.

Such techniques however have hardly considered adaptive handling of the high or low reception intensity to enhance the reception sensitivity.

DISCLOSURE OF THE INVENTION

Problem to be Solved by the Invention

Therefore, there is a strong demand of a technique which can enhance the reception intensity and widen the service area by adaptively handling a case where the reception intensity is high and a case where the reception intensity is low.

It is an object of the present invention to provide a receiver and a receiving method which are suitable for improving the reception sensitivity in spectrum spread communications or the like, a program which realizes them using a computer, and a computer readable information recording medium having the program recorded therein.

Means for Solving the Problem

To achieve the object, an invention described below is disclosed according to the principle of the invention.

The subject matter according to the first aspect of the present invention has a receiving unit, a primary demodulation unit, a second demodulation unit, a selection unit and a decoding unit, and is configured as follows.

The receiving unit receives a radio wave signal transmitted from a transmitter by modulating a transmission signal after changing the number of multiple levels at a time of multi-leveling of the transmission signal according to a communication environment.

The primary demodulation unit converts the received radio wave signal into a digital signal having two or more levels by analog-to-digital conversion before demodulation thereof.

The second demodulation unit converts the received radio wave signal into a two-level digital signal of positive and negative levels before demodulation thereof.

The selection unit selects whichever has a higher intensity from the signal demodulated by the primary demodulation unit and the signal demodulated by the second demodulation unit.

The decoding unit decodes the selected signal to acquire the transmission signal.

The receiver of the present invention can be configured to further comprise a notification unit that notifies the transmitter of a communication environment parameter based on the received radio wave signal, wherein when the signal output from the second demodulation unit is selected by the selection unit, the transmitter modulates the transmission signal after converting the transmission signal into a two-level signal with the communication environment parameter notified by the notification unit, then transmits the transmission signal.

The receiver of the present invention can be configured in such a way that the primary demodulation unit and the second demodulation unit execute spectrum spread demodulation by performing correlation with a pseudo-noise sequence.

The receiver of the present invention can be configured in such a way that the primary demodulation unit and the second demodulation unit execute demodulation by carrying out synchronization of OFDM by performing correlation with a known pseudo-noise sequence.

The receiver of the present invention can be configured so as to comprise, in place of the decoding unit, a recording unit that records the selected signal as a digital sequence.

A receiving method according to another aspect of the present invention comprises a receiving step, a primary demodulation step, a second demodulation step, a selection step and a decoding step, and is configured as follows.

In the receiving step, a radio wave signal transmitted from a transmitter is received by modulating a transmission signal after changing the number of multiple levels at a time of multi-leveling of the transmission signal according to a communication environment.

In the primary demodulation step, the received radio wave signal is converted into a digital signal having two or more levels by analog-to-digital conversion before demodulation thereof.

In the second demodulation step, the received radio wave signal is converted into a two-level digital signal of positive and negative levels before demodulation thereof.

In the selection step, whichever has a higher intensity is selected from the signal demodulated in the primary demodulation step and the signal demodulated in the second demodulation step.

In the decoding step, the selected signal is decoded to acquire the transmission signal.

The receiving method of the present invention can be configured in such a way as to further comprise a notification step of notifying the transmitter of a communication environment parameter based on the received radio wave signal, wherein when the signal output in the second demodulation step is selected in the selection step, the transmitter modulates the transmission signal after converting the transmission signal into a two-level signal with the communication environment parameter notified in the notification step, then transmits the transmission signal.

The receiving method of the present invention can be configured in such a way that in the primary demodulation step and the second demodulation step, spectrum spread demodulation is executed by performing correlation with a pseudo-noise sequence.

The receiving method of the present invention can be configured in such a way that in the primary demodulation step and the second demodulation step, demodulation is executed by carrying out synchronization of OFDM by performing correlation with a known sequence.

The receiving method of the present invention can be configured in such a way as to comprise, in place of the decoding step, a recording step of recording the selected signal as a digital sequence.

A program according to a further second aspect of the present invention is configured to allow a computer to function as individual units of the receiver.

A computer readable information recording medium recording a program according to a further second aspect of the present invention is configured to allow a computer to function as individual units of the receiver. For example, the program can be recorded in a computer readable information recording medium, such as a compact disk, flexible disk, hard disk, magneto-optical disk, digital video disk, magnetic tape, or semiconductor memory.

When a communication device is configured by using a software radio technology using a DSP (Digital Signal Processor) or FPGA (Field Programmable Gate Array), for example, the receiver of the present invention is realized by executing the program, which can be distributed and sold with respect to the communication device via a computer communication network. The information recording medium can be distributed and sold independently of the communication device.

EFFECT OF THE INVENTION

The present invention can provide a receiver and a receiving method which are suitable for improving the reception sensitivity in spectrum spread communications or the like, a program which realizes them using a computer, and a computer readable information recording medium having the program recorded therein.

Figure 1:
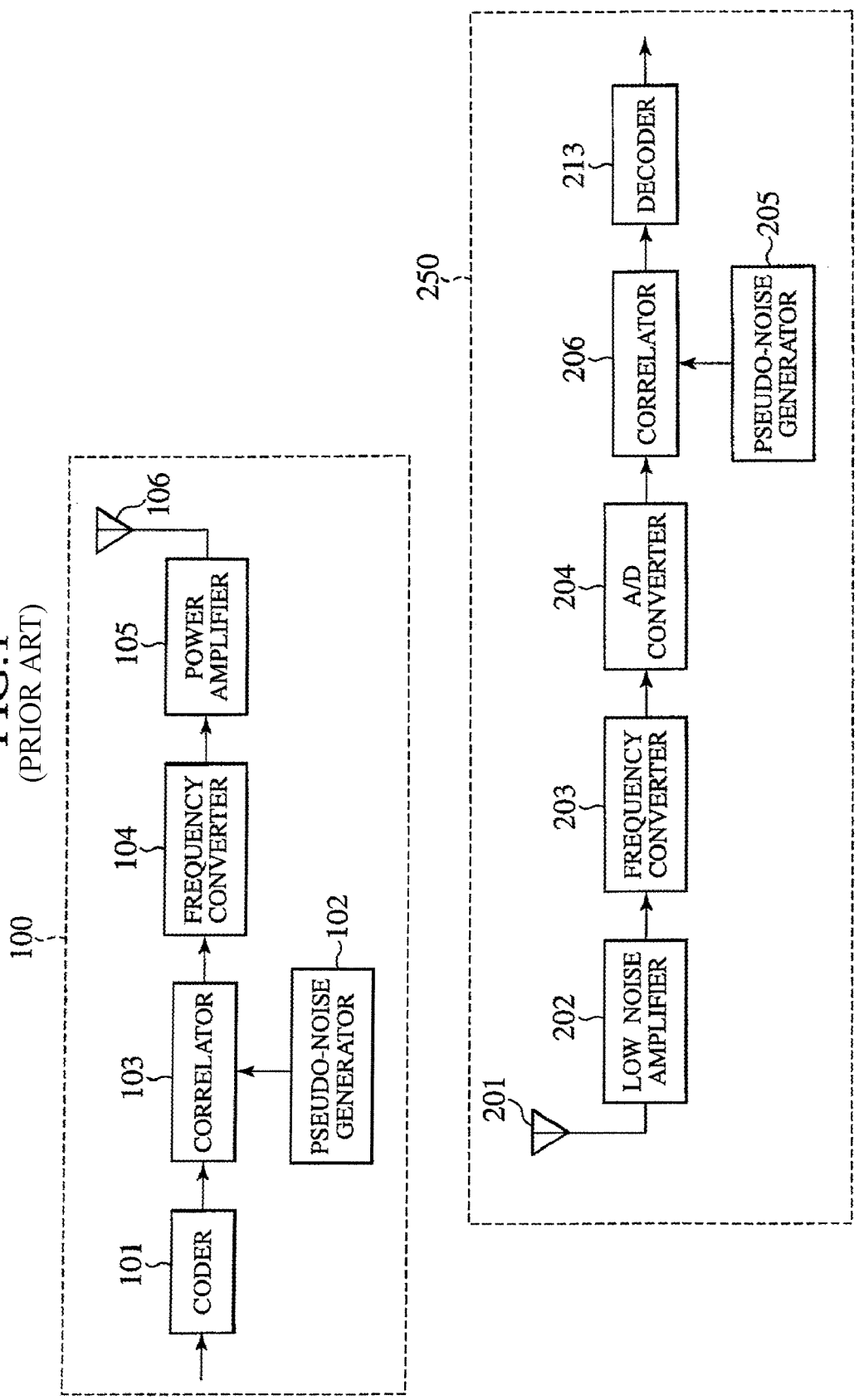
FIG. 1 A schematic structural diagram of a basic spectrum spread communication system.

DESCRIPTION OF REFERENCE NUMERALS 100 transmitter
101 coder
102 pseudo-noise generator
103 correlator
104 frequency converter
105 power amplifier
106 antenna
200 receiver
201 antenna
202 low noise amplifier
203 frequency converter
204 A/D converter
205 pseudo-noise generator
206 correlator
207 zero-level detector
208 correlator
209 absolute value detector
210 absolute value detector
211 comparator
212 switch
213 decoder
250 receiver
260 locus
261 locus
262 spread gain
263 minimum input level
270 radio base station
271 high-speed communication area
272 intermediate-speed communication area 273 low-speed communication area of the basic embodiment
274 low-speed communication area of the present invention embodiment
300 channel sounder
400 radio-wave state recording device
401 semiconductor memory

BEST MODE FOR CARRYING OUT THE INVENTION

An embodiment of the present invention will be described below. While the embodiment to be described below is given by way of illustration only, and does not limit the scope of the invention. Therefore, those skilled in the art can employ embodiments in which the individual elements or all the elements are replaced with equivalent ones, and which are also encompassed in the scope of the invention.

While the following description of the embodiment will be given of spectrum spread communication as an example, particularly, the principle of the invention is adaptable to various communication techniques, such as a mobile communication system which has a multiplex access approach added to OFDM, and such an embodiment is included in the scope of the invention.

First Embodiment

While the embodiment relates to spectrum spread communication as mentioned above, first, the schematic configuration of a basic spectrum spread communication system will be described, and then a case where the invention is adapted thereto will be described for ease of understanding.

FIG. 1 is a schematic structural diagram of a basic spectrum spread communication system. The following description will be given referring to this diagram.

A basic spectrum spread communication system illustrated in the diagram comprises a transmitter 100 and a receiver 250. Actually, the transmitter 100 and the receiver 250 are generally included in a single communication device.

The transmitter 100 has a coder 101, a pseudo-noise generator 102, a correlator 103, a frequency converter 104, a power amplifier 105 and an antenna 106.

The coder 101 encodes an input signal to be transferred. At this time, error correction coding to reduce errors in communication paths and multi-leveling to simultaneously transfer greater pieces of information in case of a good propagation state.

Though not illustrated, the propagation state is adequately fed back to the transmitter 100 from the receiver 250. Typically, parameters, such as power of a received signal and delay profile, are notified. The transmitter 100 changes the number of multiple levels or the like by referring to those parameters. The pseudo-noise generator 102 generates pseudo-noise (also called "pseudo-noise") by generating a random number. The most typical scheme of generating a pseudo-noise is to use an M sequence; however, various other random number generating techniques can be used.

The correlator 103 executes spectrum spread by performing a correlation operation on the output of the coder 101 and the output of the pseudo-noise generator 102.

The frequency converter 104 converts the output to a high-frequency signal, the power amplifier 105 amplifies the signal to power needed for communications, and the signal is radio-transmitted toward the receiver 250 from the antenna 106.

The receiver 250 has an antenna 201, a low noise amplifier 202, a frequency converter 203, an A/D converter 204, a pseudo-noise generator 205, a correlator 206, and a decoder 213.

A radio wave signal transmitted from the transmitter 100 is received at the antenna 201 to be converted into a high-frequency electrical signal, which is amplified by the low noise amplifier 202 to power needed for subsequent processes.

After amplification, the frequency converter 203 converts the signal to a baseband signal which is further converted into a digital signal by the A/D converter 204.

The pseudo-noise generator 205 in the receiver 250 generates the same pseudo-noise in synchronism with the pseudo-noise generator 102 in the transmitter 100.

Then, the correlator 206 performs a correlation operation between the digital signal and the pseudo-noise and performs spectrum despreading to reproduce the output of the coder 101 in the transmitter 100.

The decoder 213 performs the reverse operation of the decoder 213 on the result to acquire the transmitted signal.

To enhance the reception intensity to widen the service area in such a mobile communication system, it is necessary to cope even with a case where the power of radio waves to be transmitted from the transmitter 100 become weak.

This can be achieved by schemes, such as reducing distortion or thermal noise originating from the low noise amplifier 202 and the frequency converter 203, increasing the number of bits of the A/D converter 204 and increasing the number of pseudo-noise sequences to be used in the pseudo-noise generators 102, 205 on the transmitter side and the receiver side.

To reduce distortion or thermal noise originating from the low noise amplifier 202 and the frequency converter 203, it is necessary to, for example, cool the casing to lower the temperature or improve the configuration of the device itself. This is often unsuitable for weight reduction and size reduction.

The stray capacitance present in the A/D converter 204 causes quality degradation, so that there is a trade-off relationship between the width of the signal band and the number of bits. Even if the number of bits of the A/D converter 204 is increased to allow the correlator 206 to handle weaker radio waves, therefore, it is often the case that the number of bits cannot be increased significantly for wide-band signals need to be digitized particularly in spectrum spreading.

Further, while increasing the number of pseudo-noise sequences enhances the reception intensity, it lowers the communication speed.

As apparent from the above, the performance of the device itself should be improved to enhance the reception intensity.

When the intensity of radio waves is high, the receiver 250 can reproduce a greater number of reception levels. When the intensity of radio waves is low, however, the number of reproducible reception levels becomes fewer.

A mobile communication system mainly used for data communications may often adaptively change the transfer speed according to the intensity of radio waves in the receiver 250.

If information on the intensity of radio waves is shared by the transmitter 100 and the receiver 250 and the number of multiple levels of modulation in the coder 101 and the decoder 213 is adaptively changed according to the information, therefore, it is possible to employ a scheme of increasing the transfer speed by increasing the number of multiple levels of modulation when the intensity of radio waves is high and decreasing the transfer speed by reducing the number of multiple levels of modulation when the intensity of radio waves is low.

When the intensity of radio waves becomes less than the minimum bit value of the A/D converter 204, however, communications cannot be executed.

Even when adaptive modulation is carried out in the basic spectrum spread communication system illustrated in the diagram, therefore, the performance of the device itself should be improved to enhance the reception intensity.

Accordingly, the embodiment employs a receiver relating to the configuration based on the receiver 250 in this basic spectrum spread communication system.

Figure 2:
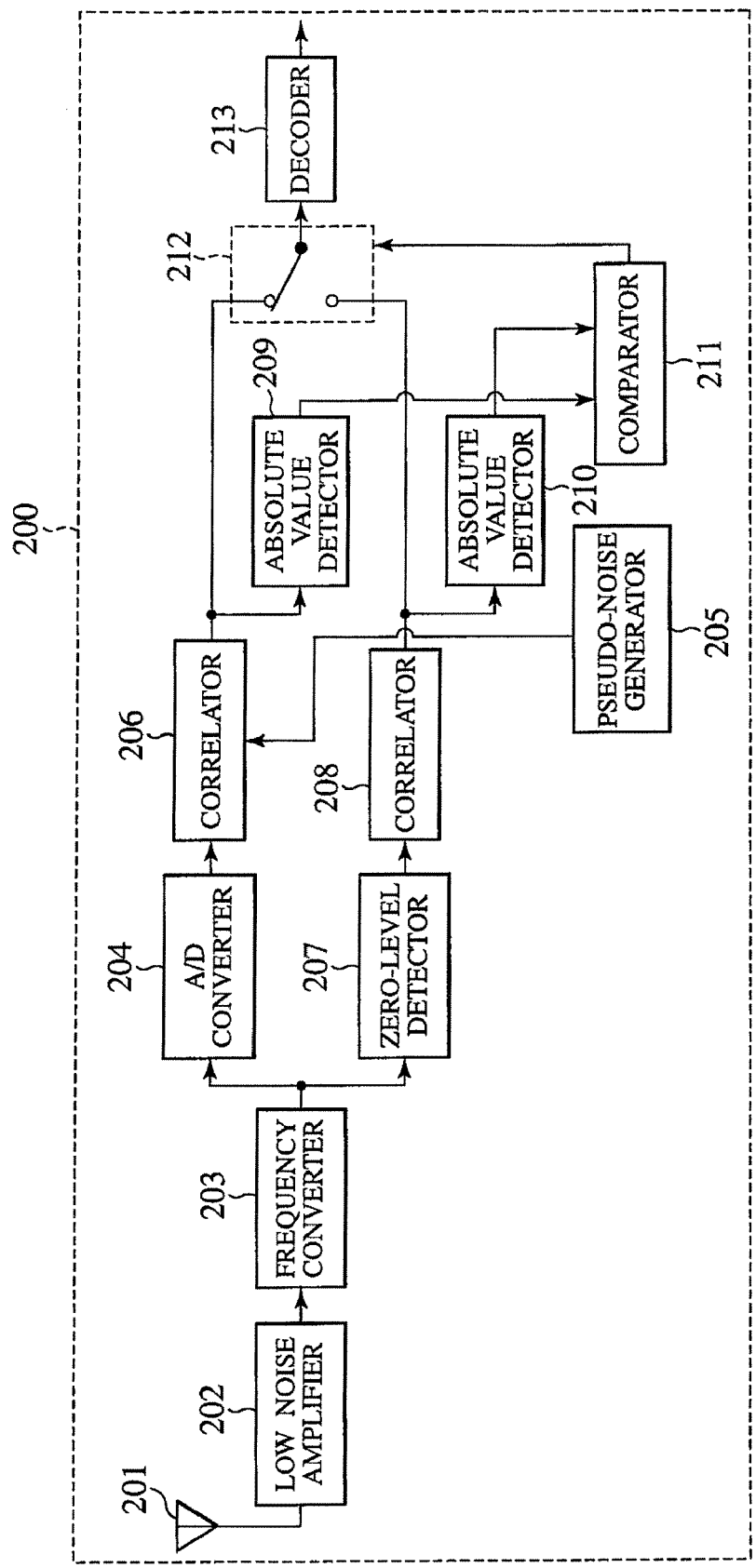
FIG. 2 An exemplary diagram showing the schematic configuration of a receiver according to an embodiment of the present invention.

FIG. 2 is an exemplary diagram showing the schematic configuration of a receiver according to the embodiment of the present invention. The following description will be given referring to this diagram.

Most of the individual elements of a receiver 200 of the embodiment are common to the elements of the receiver 250 with differences lying in provision of a path formed by a zero-level detector 207 and a correlator 208 and additional provision of absolute value detectors 209, 210, a comparator 211 and a switch 212.

For ease of understanding, descriptions of common parts will be omitted properly, and the following description will be focused on the differences.

The switch 212 serves to select one of two signal processing paths. When the upper path in the diagram is selected, the signal is processed in the order of the antenna 201, the low noise amplifier 202, the frequency converter 203, the A/D converter 204, the correlator 206 and the decoder 213. Therefore, the receiver operates quite the same way as the basic configuration shown in FIG. 1. That is, the output of the pseudo-noise generator 205 is given to the correlator 206 to be subjected to spectrum despreading.

When the lower path in the diagram is selected, on the other hand, the signal is processed in the order of the antenna 201, the low noise amplifier 202, the frequency converter 203, the zero-level detector 207, the correlator 208 and the decoder 213. In this case, the output of the pseudo-noise generator 205 is given to the correlator 208 to be subjected to spectrum despreading.

Using a comparator, the zero-level detector 207 detects even a signal with lower power than the reception power equivalent to the minimum bit value of the A/D converter 204 and performs binarization on the signal.

While the A/D converter 204 demands a linear property between the input level signal and the output digital signal, the zero-level detector 207 determines only the positiveness or negativeness of the input signal. Therefore, the zero-level detector 207 can detect even a signal level lower than the signal level of the A/D converter 204, e.g., a signal level equal to or smaller than a tenth of the resolution of the A/D converter 204.

The association with a digital signal is carried out as follows.

(a) "positive"→"1", "negative"→"0", or (b) "equal to or greater than threshold"→"1", "less than threshold"→"0"

Because a comparator outputs a constant value regardless of the level of the input signal, it is not possible, in principle, to increase the number of multiple levels of modulation. In this respect, conventionally, not much consideration has been paid to use of a comparator in such a communication system. However, one of features of the embodiment lies in the provision of the zero-level detector 207 to use the property. The performances of A/D conversion and the zero-level detection will be described below.

Figure 3:
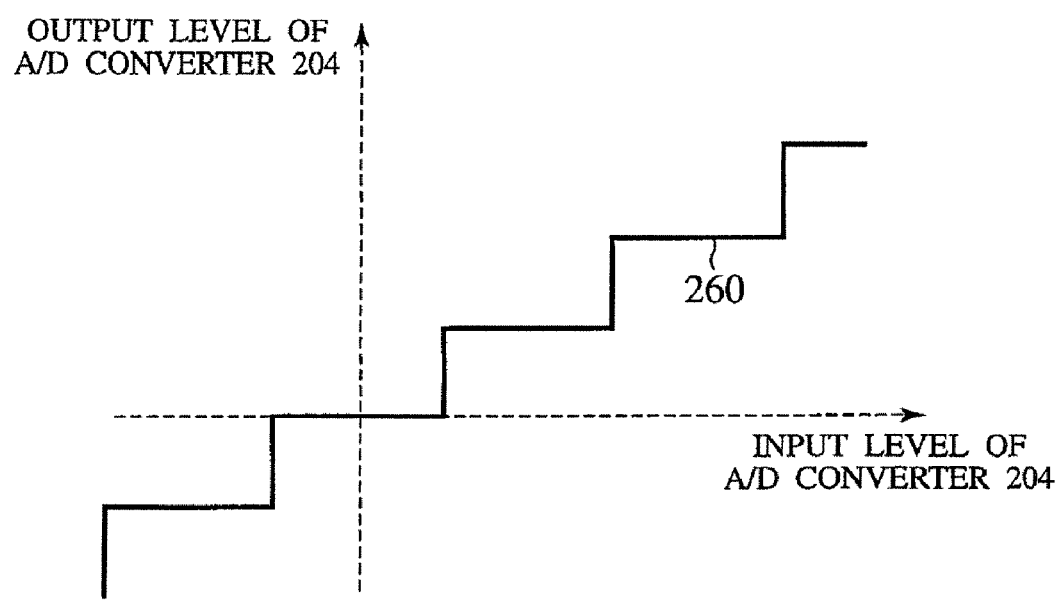
FIG. 3 A graph showing the performance of an A/D converter.

FIG. 3 is a graph showing the performance of the A/D converter 204, which will be described below referring to this diagram.

The horizontal axis of the graph shown in the diagram represents the analog input level of the A/D converter 204, and the vertical axis indicates a digital value to be output. As illustrated in the diagram, a locus 260 after A/D conversion is stepwise, and the output digital value becomes 0 near the origin of the analog input level.

Figure 4:
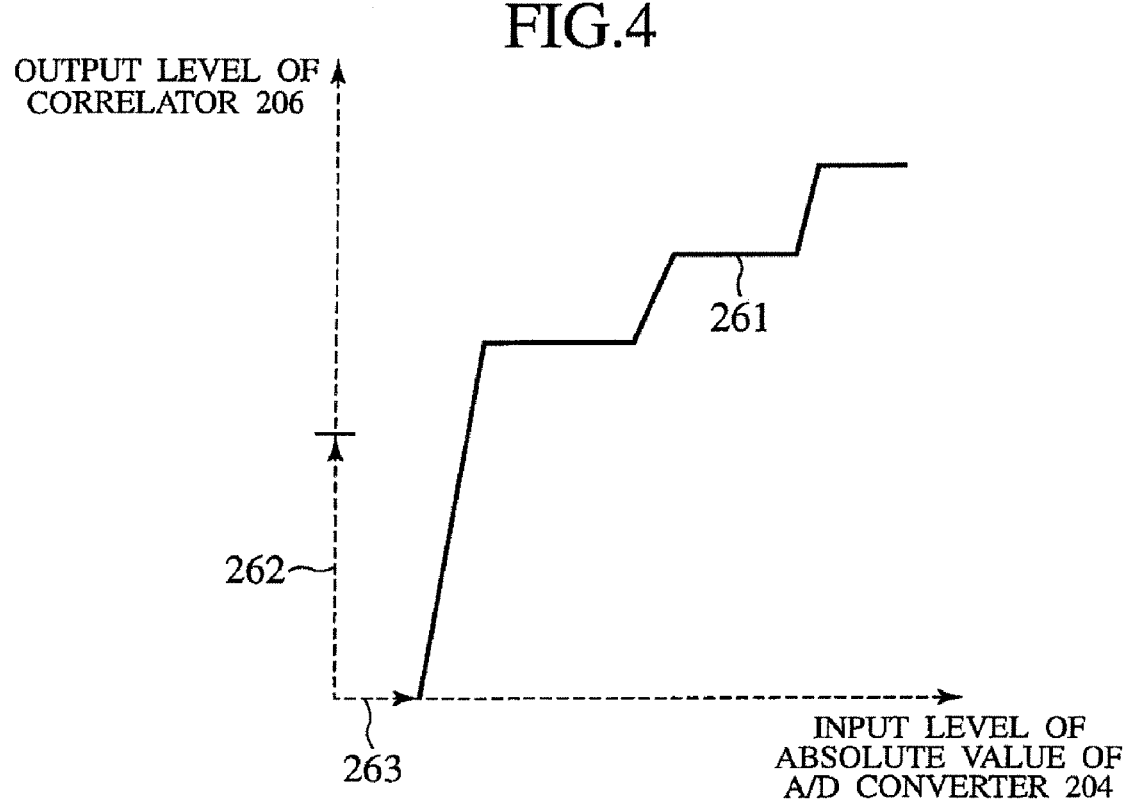
FIG. 4 A graph showing the correlation between the input level of the A/D converter and the output level of a correlator when a transmitter sends a "+" transmission signal.

FIG. 4 is a graph showing the correlation between the input level of the A/D converter 204 and the output level of the correlator 206 when the transmitter 100 sends a "+" transmission signal. The following description will be given referring to the diagram. Because the correlation when the transmitter 100 sends a "−" transmission signal in the transmitter 100 is what the positive and negative of the correlation shown in the diagram are inverted, the following description can be dilated similarly.

The horizontal axis of the graph shown in the diagram is the input level of the A/D converter 204, and the vertical axis is the output level of the correlator 206. A locus 261 of the correlation becomes a distorted stepwise shape as shown in the diagram.

That is, when the correlation between a spread code in the pseudo-noise generator 205 and the output of the A/D converter 204 is acquired by the correlator 206, a spread gain 262 is added to the input level of the A/D converter 204.

Below the level equivalent to the minimum bit value of the A/D converter 204, the output of the correlator 206 should not appear, but the output of the A/D converter 204 is actually influenced by random thermal noise which is generated in the low noise amplifier 202 or the frequency converter 203, and is changed with time. The correlator 206 averages the variation, so that the output level of the correlator 206 becomes gentle like the locus 261 shown in the diagram.

When the input level of the A/D converter 204 is equal to or less than a minimum limit 263, the output of the correlator 206 becomes zero, thus disabling communications.

Even if the gain of the low noise amplifier 202 is increased to cope with a case where the input level is low, the dynamic range is reduced so that the transferable capacity with a large input level is reduced as described above.

Figure 5:
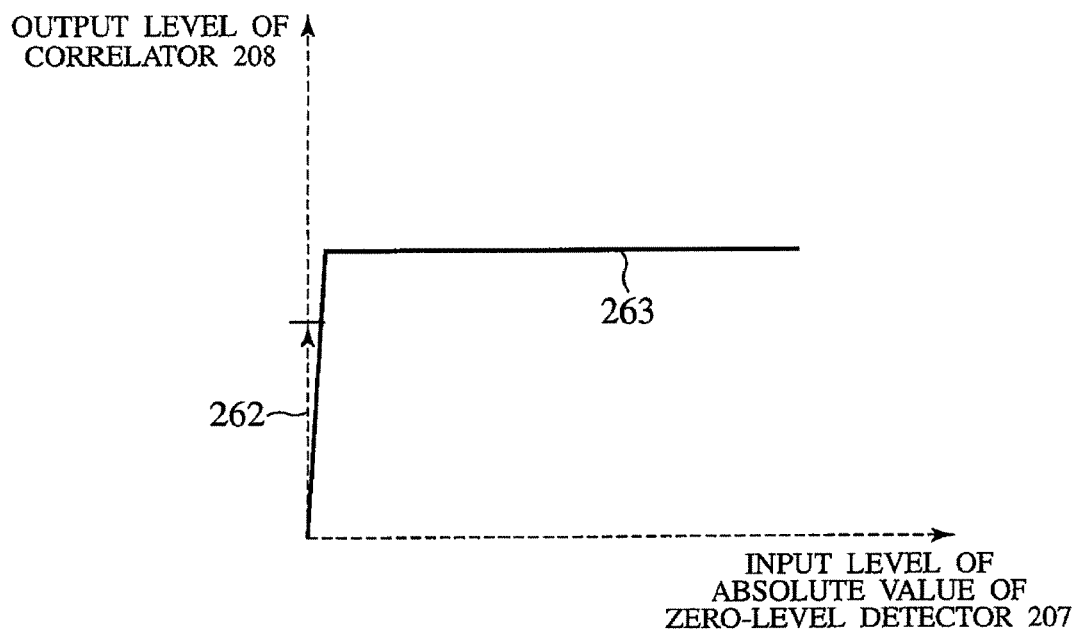
FIG. 5 A graph showing the correlation between the input level of a zero-level detector and the output level of a correlator when the transmitter sends a "+" transmission signal.

FIG. 5 is a graph showing the correlation between the input level of the zero-level detector 207 and the output level of the correlator 208 when the transmitter 100 sends a "+" transmission signal, and corresponds to FIG. 4. The following description will be given referring to this diagram. Because the correlation when the transmitter 100 sends a "−" transmission signal in the transmitter 100 is what the positive and negative of the correlation shown in the diagram are inverted, the following description can be dilated similarly.

As apparent from a locus 263 shown in the diagram, a spread gain 262 is added to the output of the correlator 208 as per the above case, and a portion equivalent to the minimum limit 263 becomes very small.

Even when the input level becomes larger, on the other hand, the output of the correlator 208 becomes constant, disabling multi-leveling so that the transfer capacity does not seem to increase.

In the embodiment, the absolute value detector 209 acquires the absolute value of the output signal of the correlator 206, the absolute value detector 210 acquires the absolute value of the output signal of the correlator 208, the comparator 211 compares those values with each other, and the switch 212 is switched so as to select a signal processing path for a larger value.

Figure 6:
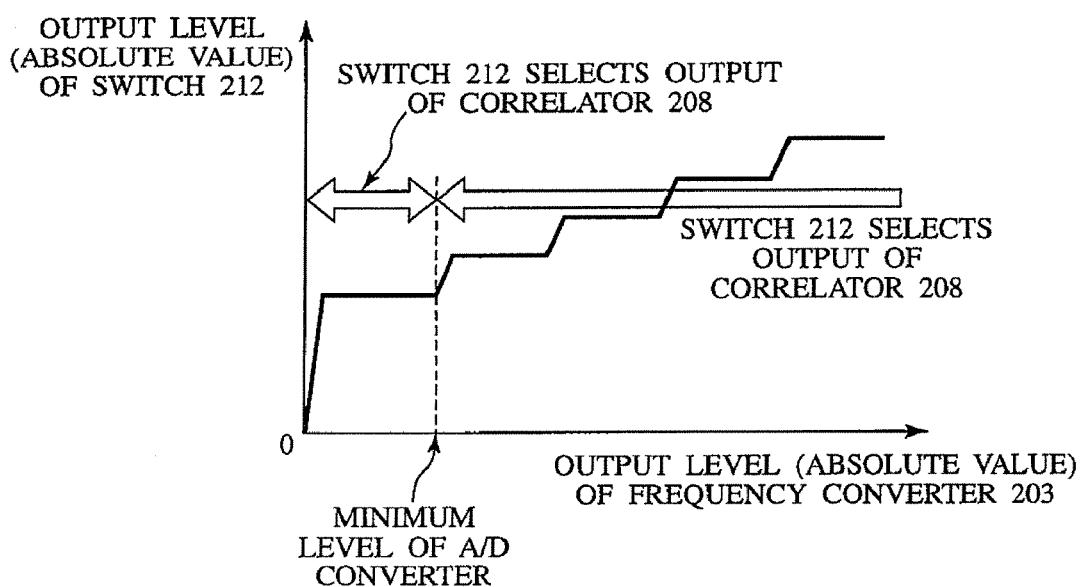
FIG. 6 A graph showing the relation between the output level (absolute value) of a frequency converter and the output level (absolute value) of a switch.

FIG. 6 is a graph showing the relation between the output level (absolute value) of the frequency converter 203 and the output level (absolute value) of the switch 212. The following description will be given referring to the diagram.

When the output level (absolute value) of the frequency converter 203 is smaller than the output level (absolute value) of the minimum level of the A/D converter 204, the switch 212 selects the output of the correlator 208. When the output level is larger, on the other hand, the switch 212 selects the output of the correlator 206. Therefore, the diagram is a graph obtained by properly separating and combining the graphs shown in FIGS. 4 and 5.

In an area where the output level of the frequency converter 203 is low, the zero-level detector 207—correlator 208 provides a higher level output than the A/D converter 204—correlator 206.

In an area where the output level of the frequency converter 203 is low, the A/D converter 204—correlator 206 provides a higher level output than the zero-level detector 207—correlator 208.

It is desirable that the coordinates of the intersection between a portion equivalent to the locus 263 and a portion equivalent to the locus 261 in FIG. 6 should be arranged at the intersection between the oblique line rising to the first step from the bottom of the stepwise locus 261 and the horizontal line of the locus 263.

That is, the absolute value of a value output from the correlator 208 when the input to the zero-level detector 207 is not near zero is so designed as to be smaller than the absolute value of the non-zero output provided by the A/D converter 204—correlator 206.

This provides the graph as shown in FIG. 6, causes the output of the switch 212 to be given to the decoder 213, and enables the reverse operation of the coder 101 to restore the transmitted signal.

The modulation system is adaptively changed between the transmitter 100 and the receiver 200 according to the state of the radio wave propagation path. One of the parameters of the radio wave propagation path is the intensity of the received signal in the receiver 200. An area where coding with a binary code should always be executed lies to the left of the portion equivalent to the locus 263 and the portion equivalent to the locus 261 in FIG. 6. It is desirable that an area moves further rightward from the mentioned area (the greater the power of the received signal), the modulation system and coding system should be adaptively and gradually changed from a binary code to a code with a greater number of levels.

Because an output is provided even at the minimum level of the A/D converter 204 or lower in the embodiment, as mentioned above, communications in a wider service area is enabled.

Figure 7:
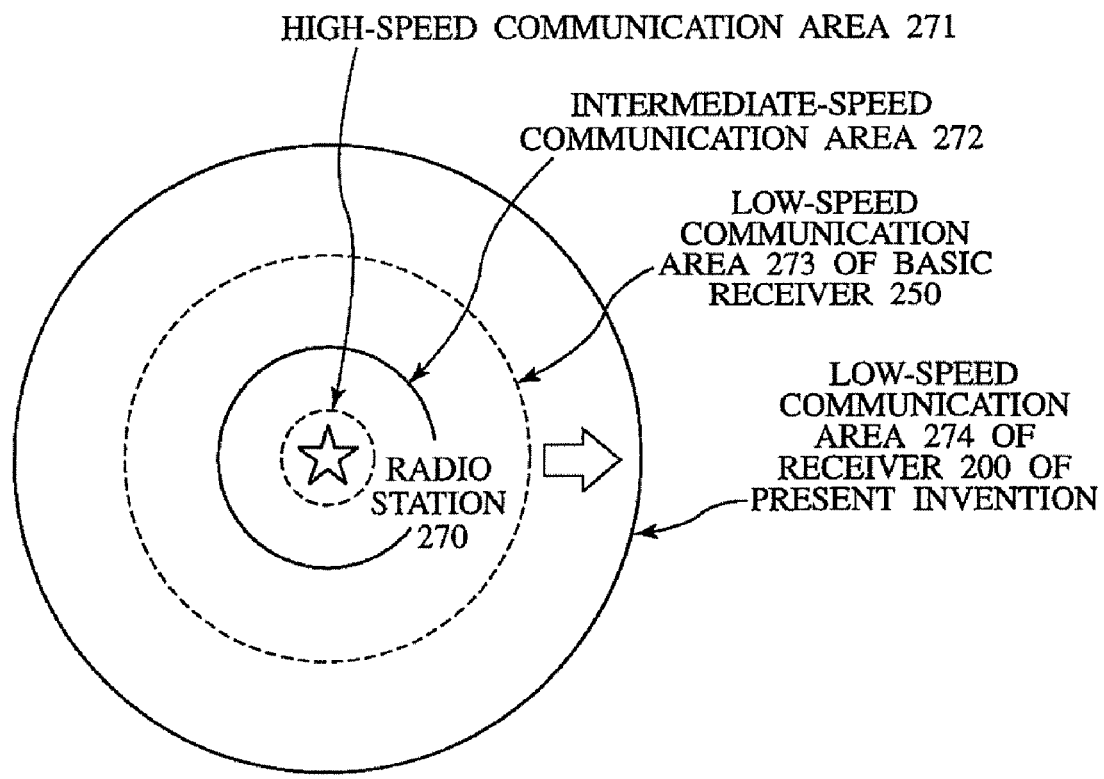
FIG. 7 A diagram of areas of expected transfer capacities around a radio base station according to the embodiment.

FIG. 7 is a diagram of areas of expected transfer capacities around a radio base station according to the embodiment. The following description will be given referring to the diagram.

Near a radio base station 270 is a high-speed communication area 271 for the intensity of radio waves there is strong. Away from the radio base station 270, there are an intermediate-speed communication area 272 and a low-speed communication area 273 of the basic receiver 250.

In the embodiment, a low-speed communication area 274 wider than the low-speed communication area 273 can be used with the high-speed communication area 271 and the intermediate-speed communication area 272 remaining as they are.

Let us consider how much the low-speed communication area is enlarged. When the zero-level detector 207 is realized by a semiconductor, it is assumed that even an input level equal to less than at least a tenth of that of the A/D converter 204 can provide an output.

In an urban area, the intensity of radio waves can be approximated to be inversely proportional to a cube of the distance, so that enlargement by at least a cube root of 10≈2.15 can be achieved as the degree of enlargement of the low-speed communication area 274 with respect to the low-speed communication area 273 in the embodiment. Therefore, the distance from the base station that executes low-speed communications becoming approximately twice the conventional one means that the number of base stations needed would be one fourth.

Therefore, communications more stable than the conventionally enabled are possible even in an area where radio waves are attenuated as in the shadow of a building or so, making it possible to provide inexpensive communication services.

While a large-capacity mobile communication system can ensure large-capacity transfer near a base station, it requires a wider dynamic range, thus narrowing the communication area. It is therefore effective to apply the invention to the system.

Although the embodiment has been illustrated as an example in which a baseband signal converted by the frequency converter 203 is supplied to the A/D converter 204 and the zero-level detector 207, the frequency converter 203 may convert the frequency only into an intermediate frequency, and a frequency converter to convert an intermediate frequency into a baseband frequency may further provided at the subsequent stage of each of the A/D converter 204 and the zero-level detector 207 before signals are supplied to the correlators 206, 208.

In this case, a frequency component close to a DC component is canceled both in the A/D converter 204 and the zero-level detector 207, so that distortion is suppressed and the linearity is improved, with a necessity to digitize analog signals of a wide range output from the A/D converter 204 and the zero-level detector 207. This may narrower the dynamic range of the A/D converter 204. Therefore, either one should be selected adequately according to the purpose.

Second Embodiment

Figure 8:
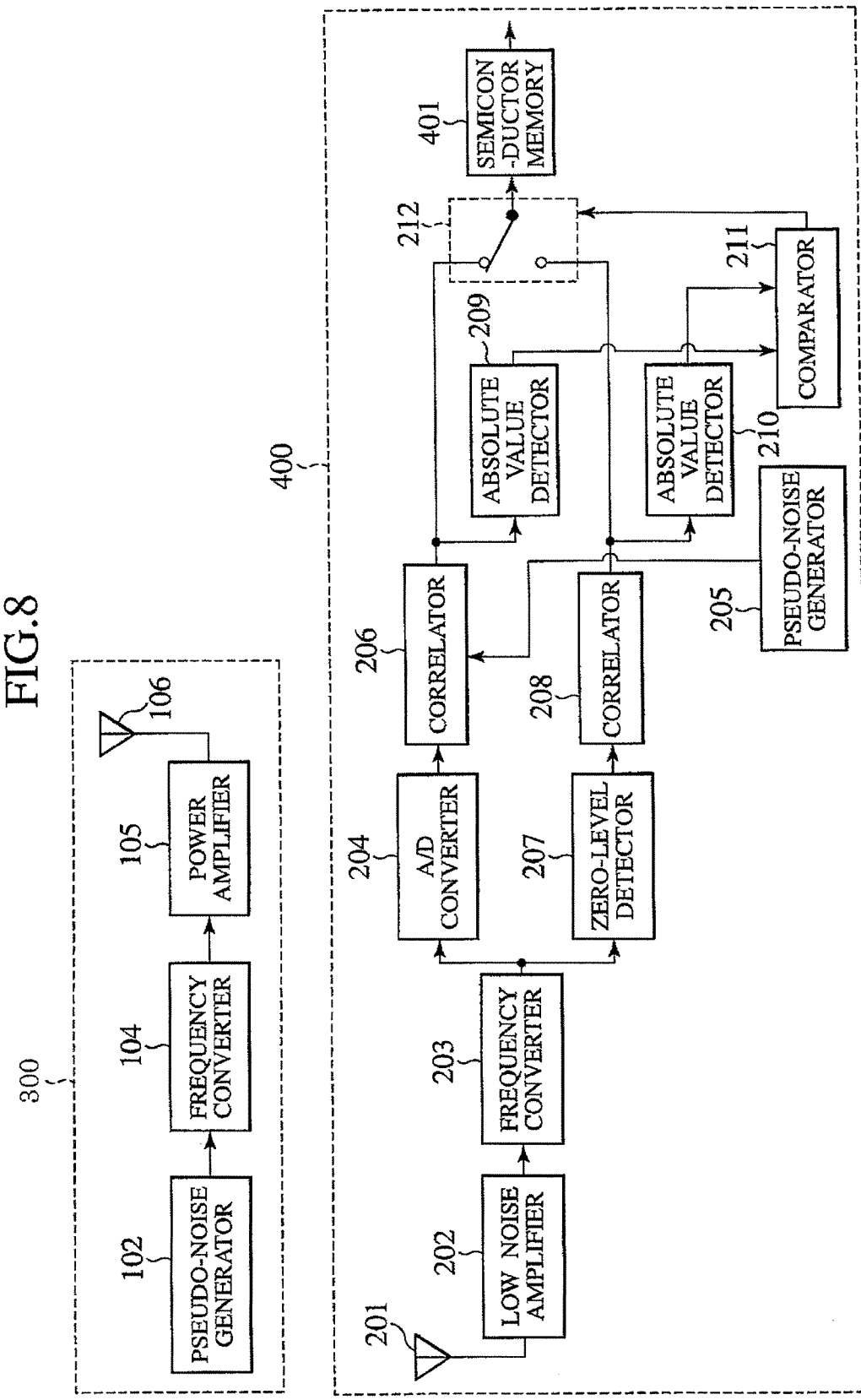
FIG. 8 An exemplary diagram showing the schematic configuration of an embodiment of the present invention adapted to a delay profile measuring device which measures the propagation path delay characteristic of mobile communications using spectrum spreading.

FIG. 8 is an exemplary diagram showing the schematic configuration of an embodiment of the present invention adapted to a delay profile measuring device which measures the propagation path delay characteristic of mobile communications using spectrum spreading. The following description will be given referring to the diagram.

A delay profile measuring device 801 according to the embodiment comprises a channel sounder 300 and a radio-wave state recording device 400 which are respectively associated with the transmitter 100 and the receiver 200.

The channel sounder 300 is the transmitter 100 from which the coder 101 and the correlator 103 are removed and the output of the pseudo-noise generator 102 is supplied directly to the frequency converter 104. Therefore, the channel sounder 300 is equivalent to the transmitter 100 which always transmits "+" codes.

The radio-wave state recording device 400 is the receiver 200 from which the decoder 213 is removed and the output of the switch 212 is recorded in a semiconductor memory 401. Therefore, echoes in the propagation path are recorded in the semiconductor memory 401 one after another.

In the embodiment, when the level of the received signal is equal to or less than the minimum level in the A/D converter 204, presence of a signal which could not be detected conventionally can be detected while an error of the signal level value increases.

While a main application example of the invention is a mobile communication system using spectrum spreading, the invention can be adapted to other mobile communication systems than the spectrum-spread type, such as a mobile communication system having a multiplex access technique added to OFDM.

For example, there is a case where a unique word (known sequence) is used at a system synchronous portion and the unique word is detected after digitalization originated by A/D conversion to acquire synchronization. Therefore, unless synchronization is acquired, communications cannot be carried out.

In such a case, if the principle of the invention is applied to detection of a unique word and both A/D conversion and zero-level detection are used to reliably acquire synchronization, the stable operation of the whole radio communication system can be expected.

INDUSTRIAL APPLICABILITY

As described above, the present invention can provide a receiver and a receiving method which are suitable for improving the reception sensitivity in spectrum spread communications or the like, a program which realizes them using a computer, and a computer readable information recording medium having the program recorded therein.

The invention claimed is:

1. A receiver comprising:
    a receiving unit that receives a radio wave signal transmitted from a transmitter by modulating a transmission signal after changing the number of multiple levels at a time of multi-leveling of the transmission signal according to a communication environment;
    a primary demodulation unit that converts the received radio wave signal into a digital signal having two or more levels by analog-to-digital conversion before demodulation thereof;
    a secondary demodulation unit that converts the received radio wave signal into a two-level digital signal of positive and negative levels before demodulation thereof;
    a selection unit that selects whichever has a higher intensity from the signal demodulated by the primary demodulation unit and the signal demodulated by the secondary demodulation unit; and
    a decoding unit that decodes the selected signal to acquire the transmission signal.

2. The receiver according to claim 1, further comprising a notification unit that notifies the transmitter of a communication environment parameter based on the received radio wave signal,
    wherein when the signal output from the secondary demodulation unit is selected by the selection unit, the transmitter modulates the transmission signal after converting the transmission signal into a two-level signal with the communication environment parameter notified by the notification unit, then transmits the transmission signal.

3. The receiver according to claim 1, wherein the primary demodulation unit and the secondary demodulation unit execute spectrum spread demodulation by performing correlation with a pseudo-noise sequence.

4. The receiver according to claim 1, wherein the primary demodulation unit and the secondary demodulation unit execute demodulation by carrying out synchronization of OFDM by performing correlation with a known sequence.

5. The receiver according to claim 1, comprising, in place of the decoding unit, a recording unit that records the selected signal as a digital sequence.

6. A receiving method comprising:
    a receiving step of receiving a radio wave signal transmitted from a transmitter by modulating a transmission signal after changing the number of multiple levels at a time of multi-leveling of the transmission signal according to a communication environment;
    a primary demodulation step of converting the received radio wave signal into a digital signal having two or more levels by analog-to-digital conversion before demodulation thereof;
    a secondary demodulation step of converting the received radio wave signal into a two-level digital signal of positive and negative levels before demodulation thereof;
    a selection step of selecting whichever has a higher intensity from the signal demodulated in the primary demodulation step and the signal demodulated in the secondary demodulation step; and
    a decoding step of decoding the selected signal to acquire the transmission signal.

7. The receiving method according to claim 6, further comprising a notification step of notifying the transmitter of a communication environment parameter based on the received radio wave signal,
    wherein when the signal output in the secondary demodulation step is selected in the selection step, the transmitter modulates the transmission signal after converting the transmission signal into a two-level signal with the communication environment parameter notified in the notification step, then transmits the transmission signal.

8. The receiving method according to claim 6, wherein in the primary demodulation step and the secondary demodulation step, spectrum spread demodulation is executed by performing correlation with a pseudo-noise sequence.

9. The receiving method according to claim 6, wherein in the primary demodulation step and the secondary demodulation step, demodulation is executed by carrying out synchronization of OFDM by performing correlation with a known sequence.

10. The receiving method according to claim 6, comprising, in place of the decoding step, a recording step of recording the selected signal as a digital sequence.

* * * * *